Nov. 11, 1952 J. W. GRAY 2,617,586
COMPUTER
Filed Oct. 28, 1949 3 Sheets-Sheet 1

Inventor
JOHN W. GRAY
By
H. A. Mackey
Attorney

Nov. 11, 1952   J. W. GRAY   2,617,586
COMPUTER
Filed Oct. 28, 1949   3 Sheets-Sheet 2

Inventor
JOHN W. GRAY
By
H. L. Mackey
Attorney

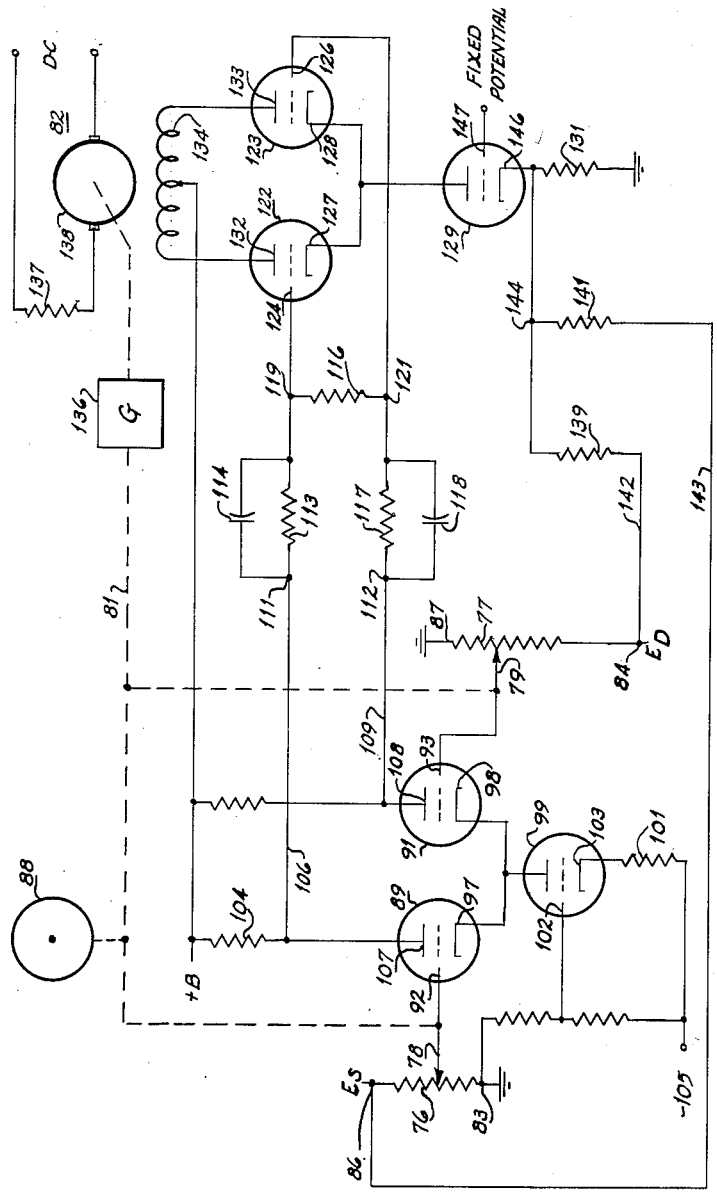

Patented Nov. 11, 1952

2,617,586

UNITED STATES PATENT OFFICE 2,617,586

COMPUTER

John W. Gray, White Plains, N. Y., assignor to General Precision Laboratory Incorporated, a corporation of New York Application October 28, 1949, Serial No. 124,002

1 Claim. (Cl. 235—61)

This invention relates to a computer for the computation of a mathematical function, and more particularly to a device for dividing one quantity by another quantity and representing the value of the quotient by the rotational displacement of a shaft.

More specifically the instant invention contemplates the provision of apparatus wherein input data consisting of two varying electrical quantities are divided one by the other, with the resultant quotient represented by the angular displacement of a shaft. In the solution of such a problem either of the two input data constituting the dividend and divisor may have any value between a desired maximum and zero, thus the quotient may vary between zero and infinity and the output shaft must have an angular rotation which is representative of all values including both of these extremes. To this end a non-linear scale is provided which has as its limits the values of zero and infinity, permitting the indication of any possible value of the quotient of the input data.

The device of the present invention finds particular application in systems which indicate the position of airplanes or like vehicles traveling over the earth's surface although it is by no means limited thereto. In such systems it is frequently desirable to indicate continuously on a dial or other indicating device the estimated time in hours and minutes which will be required to complete a flight or other journey to a selected designation, the time indication becoming more critical the nearer the approach to the destination. The data available for such a determination consists of the distance in miles remaining to be traveled, which continuously decreases as the vehicle approaches its destination, and the speed of the vehicle which may be constant or may vary from time to time.

The employment of the instant invention in the solution of this or any other suitable problem utilizes the principle that when an electric potential is impressed on the ends of a resistor the potential varies along the resistor in direct proportion to the variation of resistance. That is, $$\frac{e}{E} = \frac{r}{R}$$

where E is the voltage impressed across the ends of a voltage divider of total resistance R, $r$ is the resistance from any point of the divider to one end and $e$ is the voltage between that point and the same end.

Two such dividers are used each having one of the input data potentials impressed thereacross and a servomechanism is employed to vary the position of a slider contact simultaneously on each of said dividers, the input of the servomechanism or error voltage being constituted by the potential between the sliders and the output consisting of the angular position of a shaft which operates an indicator dial. Additionally the servomechanism may be provided with stabilizing circuits in such fashion that the rate of change of input acts in a degenerative sense to prevent hunt.

The general purpose of this invention therefore, is to provide means for automatically and continuously dividing one variable quantity by another variable quantity.

More specifically, the purpose of this invention is to divide one electric potential by another electric potential and by means of an angular shaft displacement to indicate the quotient on a scale having zero at one end and infinity at the other end.

The exact nature of this invention will be more clearly understood from the following detailed description and from the accompanying drawings in which:

Figure 3 is a schematic diagram of an embodiment of this invention employing direct current input data.

Figure 1:
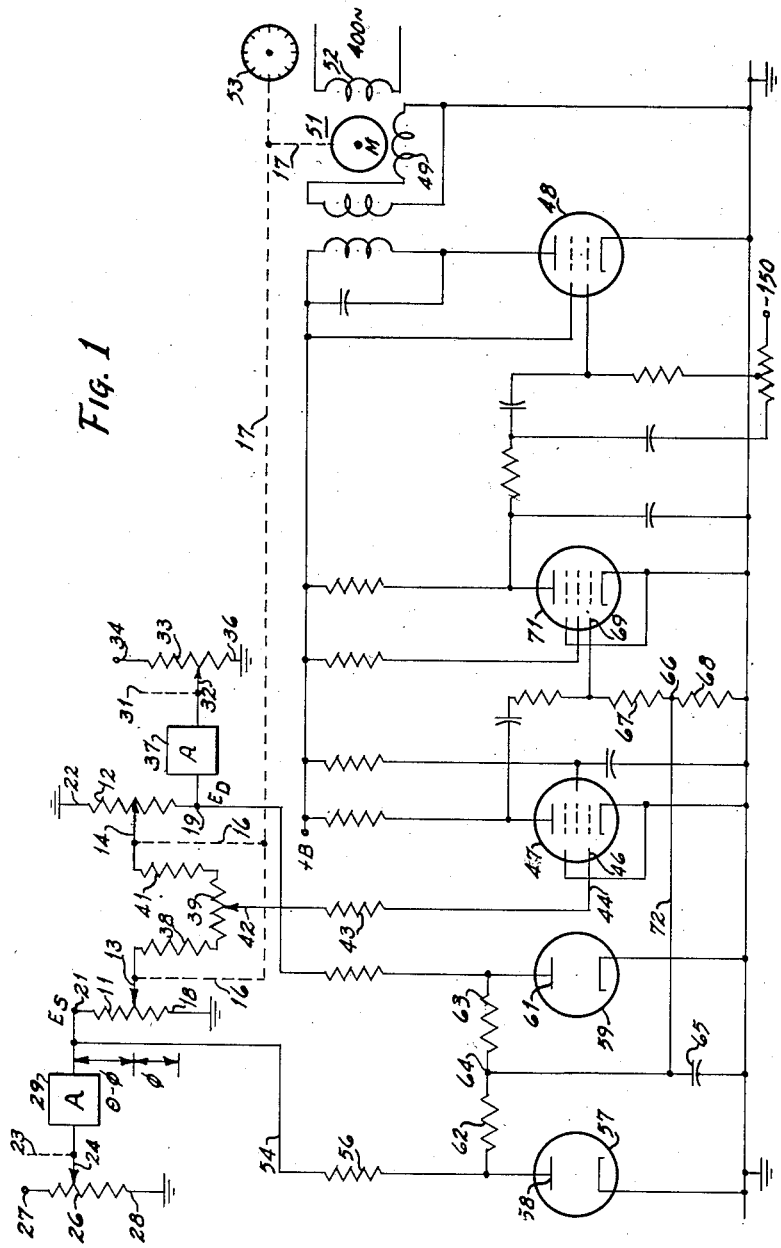
Figure 1 is a schematic diagram of one embodiment of this invention employing alternating current input data.

In Fig. 1 there is illustrated apparatus carrying out the purposes of this invention employing alternating current input data. This apparatus consists essentially of two voltage dividers 11 and 12 so arranged that their sliders move together mechanically but electrically move in opposite directions. To this end the two sliders 13 and 14 are mechanically joined by the yoke 16 to the motor shaft 17 to be moved in concert thereby. The two adjacent terminals 18 and 19 of the voltage dividers are connected respectively to ground and to one source of input data potential $E_D$, while the two remaining adjacent terminals 21 and 22 are connected to the other source of input data potential $E_s$ and ground respectively. Therefore, when the sliders 13 and 14 are moved in concert to one end of their path the slider 13 is at ground and the slider 14 has the potential $E_D$, while at the other end of the path the slider 13 has the potential $E_s$ and the slider 14 is at ground potential. The potentials $E_s$ and $E_D$ may have any convenient frequency as, for instance, 400-cycles per second, alternating current having the advantage over direct current that its use somewhat simplifies the apparatus of the invention.

As a specific example of the utility of this invention there is chosen the problem of ascertaining from the speed of an airplane and the distance to be traveled to an objective the time required to reach the objective, that is, the solution of $$T = \frac{E_D}{E_s} \quad (1)$$

in which T is the time required to reach the objective, $E_D$ is a voltage proportional to the distance to be traveled, and $E_s$ is a voltage proportional to the speed. In order to control the scale of the dial on which the time T appears and to balance the equation in a dimensional sense it is necessary to introduce a scale factor $T_0$ that has the dimension of time. Equation 1 then becomes $$T = \frac{E_D}{E_s} T_0 \quad (2)$$

In order to develop the potential $E_s$ representing airplane speed a shaft 23 actuated by a speed indicator is made to actuate the slider 24 of a voltage divider 26 that is energized at its terminal 27 by a source of 400-cycle potential, the remaining terminal 28 being grounded. The slider 24 is connected through an isolating amplifier 29 to the terminal 21 on which the voltage $E_s$ is impressed. Similarly, the potential $E_D$ is developed by actuating a shaft 31 from any desired mechanism, manual or automatic, that indicates the distance to be traveled to the destination of the airplane. The shaft 31 controls the position of a slider 32 of a voltage divider 33 that is energized by a 400-cycle potential source at one terminal 34, the other terminal 36 being grounded. The slider 32 is connected through an isolating amplifier 37 to the terminal 19 on which the potential $E_D$ is impressed.

It is, of course, obvious that any of a large variety of other means of generating and applying the input data may be employed, depending on the methods selected for ascertaining speed and distance to be traveled, so long as the data are presented to the computing dividers 11 and 12 in the form of alternating current potentials.

The two computing voltage dividers 11 and 12 constitute a dividing mechanism that operates in connection with a servomechanism to move the sliders 13 and 14 to their null or balance point. When this has been done the displacement of the motor shaft 17 represents the quotient T of the two input data values in accordance with Equation 2. The difference between the voltages of the sliders 13 and 14 generates the error signal and in order to operate the associated servomechanism this error signal must be sensed. This may be accomplished in a large number of ways and in this embodiment employing 400-cycle supply potential several methods are available. If the phases of the potentials at the sliders 13 and 14 are made equal, the error signal may be sensed by use of a transformer or by a differential amplifier. However, somewhat simpler equipment can be used if the phases of the slider potentials are made to be exactly 180° apart by any means as, for example by supplying the terminals 27 and 34 from the opposite ends of the same transformer secondary coil. In such a case the sliders 13 and 14 then are joined by a resistance bridge. If the scale factors of the voltage dividers 11 and 12 are so designed that at null the potentials of the sliders 13 and 14 are equal in magnitude, although opposite in phase, then it is obvious that at null the resistive center of the bridge composed of the resistances 38, 39 and 41 will be at ground potential.

In Fig. 1 let the total computing voltage divider slider travel path length be termed $\theta$, and let the distance from the grounded end of the voltage divider slider 13 at balance be termed $\phi$. The distance of the slider from its $E_s$ terminal 21 is then $\theta - \phi$. The potential of the slider 13 is $$\frac{\phi}{\theta} E_s$$

and the potential of the slider 14 is $$\frac{\theta - \phi}{\theta} E_D$$

These two potentials are equal at null if the resistance from the slider 13 to the slider 42 equals the resistance from slider 42 to slider 14, so that $$\frac{\phi}{\theta} E_s = \frac{\theta - \phi}{\theta} E_D \quad (3)$$

or $$\frac{E_D}{E_s} = \frac{\phi}{\theta - \phi} \quad (4)$$

combining with (2), $$T = \frac{\phi T_0}{\theta - \phi} \quad (5)$$

This relation between the time T required to reach the destination and the angular slider position is employed to lay out a time scale, and such a scale constructed by use of this equation and applied to the shaft 17 presents the relation between the angular displacement and the time to destination; such a scale can, of course, be constructed to read in terms of hours, minutes and seconds of time.

Figure 2:
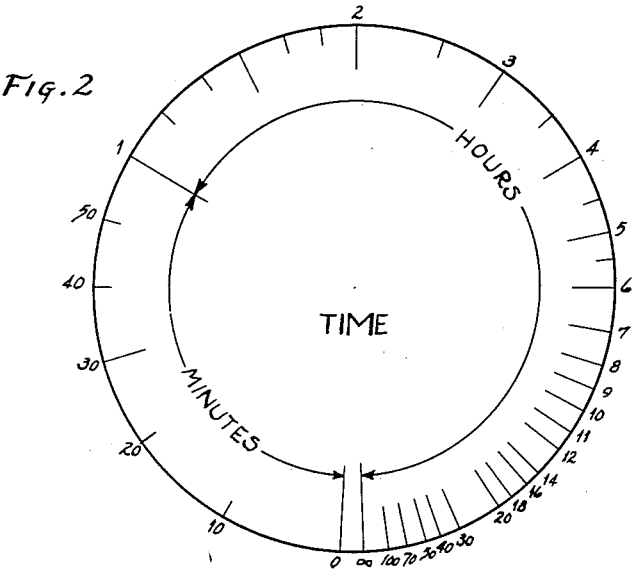
Figure 2 illustrates one form of scale for indicating the computed result.

Such an arrangement as indicated by reference to Equation 5 produces a unique indicator scale which includes both the values 0 and infinity. Furthermore, the scale so formed is generally hyperbolic at its high end with the division indicia relatively closely spaced at uncritical large time measurements, while the midsection is generally logarithmic having large scale divisions permitting accurate readings for the nearer and more critical approach times. Finally the low end of the scale approaches linearity, allowing more accurate readings to be made at critical approach times, the readings between scale divisions being more easily estimated on a linear scale. Such a scale is illustrated in Fig. 2.

Likewise, if one of the input data be held constant, the law of scale variation will be different from the law of variation of the remaining input data. Thus the invention serves as a means of changing a scale. For instance, one of the voltage divider input terminals may be maintained at a constant voltage and data consisting of a variable input voltage impressed upon the other input terminal, thereby producing an output, which while it is a function of the input voltage produces a scale indication that may vary as the logarithm or in accordance with some other function of the input data rather than varying linearly. When the scale factors of the voltage dividers 11 and 12 are such that the ratio of the voltages of the sliders 13 and 14 is required to be other than unity at null, it follows that the ratio of the resistors 38 and 41 with the associated parts of the voltage divider 39 must be given a value other than unity in the same proportion in order for the voltage of the slider 42 at null to be that of ground.

The voltage dividers 11 and 12 may be made nonlinear for the purpose of changing the angular relations of the time scale in any desired manner.

The computing voltage dividers described are automatically balanced or brought to the point representing the solution of Equation 2 by incorporation into a servomechanism, the voltage of the slider 42 being the error voltage. This error voltage is fed through a resistor 43 and conductor 44 to the control electrode 46 of a pentode discharge tube 47 comprising the first stage of a three-tube amplifier. The final tube 48 is connected to one field winding 49 of a two-phase 400-cycle motor 51 whose other field winding 52 is connected to a source of 400-cycle power. The motor 51 then rotates in a direction and at a speed depending on the magnitude and sense of the error voltage at the slider 42. The motor shaft 17 is connected to the sliders 13 and 14 so as to move them in concert in the direction that reduces the error signal, and the shaft 17 is also connected to a dial 53 bearing the above-described scale. The reading of this scale when the error signal has been reduced to zero and the bridge has been balanced is the quotient of $E_D$ divided by $E_s$.

Instability may present a problem in any servomechanism and in the instant apparatus the computing potentiometers in addition present a particular problem, because the amount of error signal at unit distance from balance varies with the magnitudes of the separate voltages constituting the input data and applied to the terminals of the computing voltage dividers. Accordingly in this apparatus it is desirable to secure a stabilizing signal directly proportional to the average value of the input data voltage magnitudes at any instant, and to apply this signal to reduce the amplifier gain, so that the larger the input data the less the gain. This is done as follows: One stabilizing input is secured from the $E_s$ potential terminal 21 by means of a conductor 54 connected therefrom to a resistor 56 and diode 57 having its cathode grounded. Due to the rectifying action of this diode, a negative potential appears at its anode 58 directly proportional to the magnitude of the alternating potential $E_s$. Similarly, a diode 59 is connected between the $E_D$ terminal 19 and ground, and a negative potential appears on its anode 61 that is directly proportional to the magnitude of $E_D$. The two anodes 58 and 61 are connected by two resistors 62 and 63, with the mid-terminal 64 thereof connected through the conductor 72 to a terminal 66 constituting the junction of the bias resistors 67 and 68 of the second amplifier stage. A smoothing condenser 65 is connected to the midterminal 64. The ratio of the resistances 62 and 63 is made the same as the ratio of the resistances 38 and 41. The negative potential that appears at the terminal 64 is then directly proportional to the average value of the data producing the potentials $E_s$ and $E_D$, and this negative potential is applied through the conductor 72 to control the gain of the amplifier tube 71 by serving to bias its grid negatively. This negative bias reduces the gain of the amplifier in a degree roughly proportional to the average of $E_s$ and $E_D$ and therefore effects stabilization of the servomechanism.

In Fig. 3 there is depicted an embodiment of the instant invention employing direct current input data for use in applications where such data must be employed or are desirable. Two computing voltage dividers 76 and 77 are arranged for motion of their sliders 78 and 79 in concert under control of the shaft 81 of a motor 82, and are connected oppositely, so that when the sliders are moved in concert to one end of their travel path the slider 78 is at the grounded terminal 83 of the voltage divider 76 while the slider 79 is at the high voltage terminal 84 of the voltage divider 77. When the sliders are at the opposite end of their travel path the slider 78 is at its high voltage terminal 86 while the slider 79 is at its grounded terminal 87. Input data representing airplane speed, generated by any desired means in the form of direct current voltage magnitudes, are presented to the circuit at the terminal 86, this voltage being termed $E_s$. The input data representing distance to be traveled by the airplane, generated by any desired means in the form of direct current magnitudes, are presented to the circuit at the terminal 84, this voltage being termed $E_D$.

The computing voltage dividers 76 and 77 are operated in conjunction with a device for sensing the difference in voltages of the sliders 78 and 79 and with a servomechanism employing that difference as its error signal, the degeneratively fed back shaft of the servomechanism moving the sliders 78 and 79 in concert toward the position that makes the error signal zero and also operating an output dial 88 on which there appears an indication T that is a function of the displacement of the servomechanism feedback shaft. When the error signal has been reduced to zero the indication T is the value of the quotient of the potential values $E_D$ and $E_s$ as indicated in Equation 2. At this point the potentials of the sliders 78 and 79 are equal, and the Equation 5 previously developed may be employed, using the same reasoning, and applied without change to design of a scale for the dial 88.

The sensing, subtracting and amplifying circuit necessary for evaluation of the error signal constituted by the potential difference of the sliders 78 and 79 consists primarily of two triodes 89 and 91 having their control grids 92 and 93 connected to the sliders 78 and 79 respectively. The cathodes 97 and 98 are joined and connected to a source of negative potential. In order to maintain a constant total space current through the two triodes a constant current device consisting of a triode 99 and cathode resistor 101 are inserted in series between the cathodes 97 and 98 and the source of negative potential. The grid 102 is connected to constant potential which holds the cathode 103 at a substantially constant slightly higher potential. Since the resistance 101 is constant and the potential thereacross is constant the current therethrough is constant also, and therefore, at all times the sum of the currents through the triodes 89 and 91 is equal to the space current of the triode 99. This constancy of current aids the accuracy of the differential action of the triodes 89 and 91.

If the slider 78 should increase in potential, increasing the potential of the grid 92, the current through the triode 89 will increase, increasing the drop in the anode resistor 104 and decreasing the output potential at the conductor 106 connected to the anode 107. However, since the total current through the two triodes 89 and 91 must remain equal, a corresponding current decrease must occur in the triode 91 causing an increase in the anode 108 potential and in the output conductor 109 attached thereto. The reverse change of potential of the slider 78 will cause opposite changes of potential in the output conductors, and any changes in potential of the slider 79 if opposite to those of the slider 76 will add in effect. Therefore, it is obvious that the potential difference between the conductors 106 and 109 will be representative in sense and magnitude of the potential difference between the sliders 78 and 79.

The conductors 106 and 109 are connected to the input terminals 111 and 112 of a phase advance circuit consisting of a resistor 113 shunted by a condenser 114 in series with a resistor 116 and a second RC circuit composed of the resistor 117 and condenser 118. The output terminals 119 and 121 are connected to a final differential amplifier.

This amplifier may have any requisite number of stages but for the purpose of illustration is represented by a single stage comprising two triodes 122 and 123. The grids 124 and 126 are connected to the terminals 119 and 121, and the cathodes 127 and 128 are connected together and to ground through a triode 129 and resistor 131, the function of which will be described later. The anodes 132 and 133 are connected to the terminals of the field 134 of a split field motor 82. The center tap of the field is returned to a source of positive potential, so that the current difference in the two halves of the field caused by the differential action of the amplifier operates the motor in a sense and at a speed depending upon the error voltage. The motor shaft is connected to the sliders 78 and 79 through a reduction gear 136 and the rotation of the shaft 81 is arranged to be in such direction as to move the sliders to their null position. Motor response is improved by the use of a resistor 137 in series with its armature 138.

Stability of the servomechanism circuit may be improved by employing the stabilizing method of Fig. 1 in which the input data voltages are averaged and caused to control the amplifier gain in an inverse sense. Since the inputs in the circuit of Fig. 3 are direct current, however, the use of diode rectifiers is not necessary and two equal resistors 139 and 141 are connected in series between the E_D input terminal 84 and the E_s input terminal 86 through conductors 142 and 143. The mid-terminal 144 of these resistors is then proportional to the average potential of the E_s and E_D input terminals. The terminal 144 is connected to the cathode 146 of the triode 129, which has its grid 147 anchored to a fixed source of a suitable potential. Under these conditions the current flowing in the triode 129 is dependent on the cathode potential with relation to the grid potential, and the current in turn controls the transconductance of the triodes 122 and 123. Any change such as an increase in the average input data potential will decrease the current flowing in the triode 129, will decrease the transconductance of both triodes 122 and 123 and will lower the stage gain, therefore acting to stabilize the servomechanism.

Figure 4:
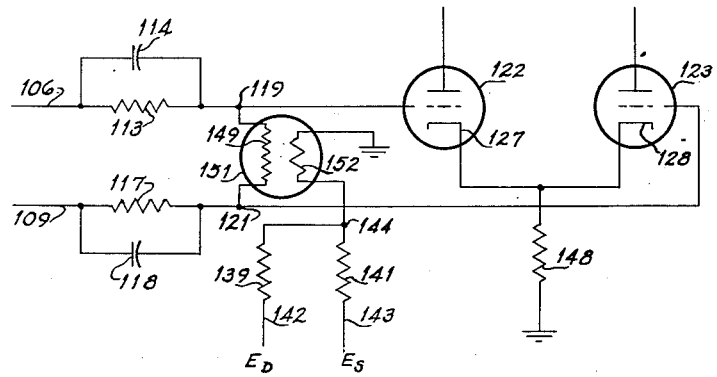
Figure 4 is a circuit showing a portion of Fig. 3 modified to employ a different method of stabilization using a thermistor.

In place of the triode 129 used as a means of applying the average value of the two input voltages to control the amplifier gain and stabilize the servomechanism, a thermistor may be employed. In Fig. 4, phase advance circuits similar to those of Fig. 3 actuated through the conductors 106 and 109 are reproduced, using the same reference characters, as are the differential amplifier triodes 122 and 123. However, the differential amplifier cathodes 127 and 128 are connected to ground directly through a resistor 148, eliminating the triode 129 of Fig. 3. The input data terminals are bridged as before through the conductors 142 and 143 by the equal resistors 139 and 141 having a midterminal 144. As part of the phase changing network however, replacing the resistor 116 of Fig. 3, there is connected between the terminals 119 and 121 the heat-sensitive portion 149 of a thermistor 151. This thermistor also contains a heater 152 that is connected between the terminal 144 and ground. The heat-sensitive thermistor portion 149 acts as an attenuator connected across the input terminals of the differential amplifier, its attenuation increasing with decreasing resistance caused by increased heating of the heater 152 when the input data voltage $E_s$ and $E_D$ increase. This action therefore, effects stabilization of the servomechanism.

It will be apparent to one skilled in the art that the thermistor method of stabilization may also be applied to the alternating current data circuit of Fig. 1, it being desirable in this case to employ a thermistor having two heaters, and to apply the attenuation at an amplifier control grid.

What is claimed is:

Apparatus for indicating a quotient of first and second alternating voltages comprising, a first voltage divider energized by said first alternating voltage, a second voltage divider energized by said second alternating voltage, a first slider upon said first voltage divider, a second slider upon said second voltage divider, resistive circuit means connected to said first and second sliders, an amplifier, an electrical connection from said resistive circuit means to the input terminals of said amplifier, first rectifier means connected to said first voltage divider for rectifying a portion of said first alternating voltage, second rectifier means connected to said second voltage divider for rectifying a portion of said second alternating voltage, means for securing a non-alternating voltage representative of the average of the rectified voltages of said first and second rectifier means, means for applying said representive voltage to control of the gain of said amplifier so that said gain is inversely representative of the magnitude of said average voltage, a motor actuated by said amplifier output in a direction dependent on the sense of said amplifier input, means constituting degenerative feedback operated by said motor for simultaneously varying the positions of said sliders on said first and second voltage dividers in opposite directions and an indicator for said quotient operated by said last named means.

JOHN W. GRAY.

REFERENCES CITED

The following references are of record in the file of this patent:

UNITED STATES PATENTS

| Number | Name | Date |
|---|---|---|
| 2,331,360 | Tuckerman | Oct. 12, 1943 |
| 2,439,381 | Darlington | Apr. 13, 1948 |
| 2,454,107 | Wald | Nov. 16, 1948 |
| 2,476,747 | Lovell | July 19, 1949 |
| 2,494,036 | Darlington | Jan. 10, 1950 |
| 2,531,682 | Hornfeck | Nov. 28, 1950 |
| 2,534,505 | Ergen | Dec. 19, 1950 |
| 2,538,253 | Lakatos | Jan. 16, 1951 |
| 2,544,286 | Tanner | Mar. 6, 1951 |